Patented Apr. 12, 1938

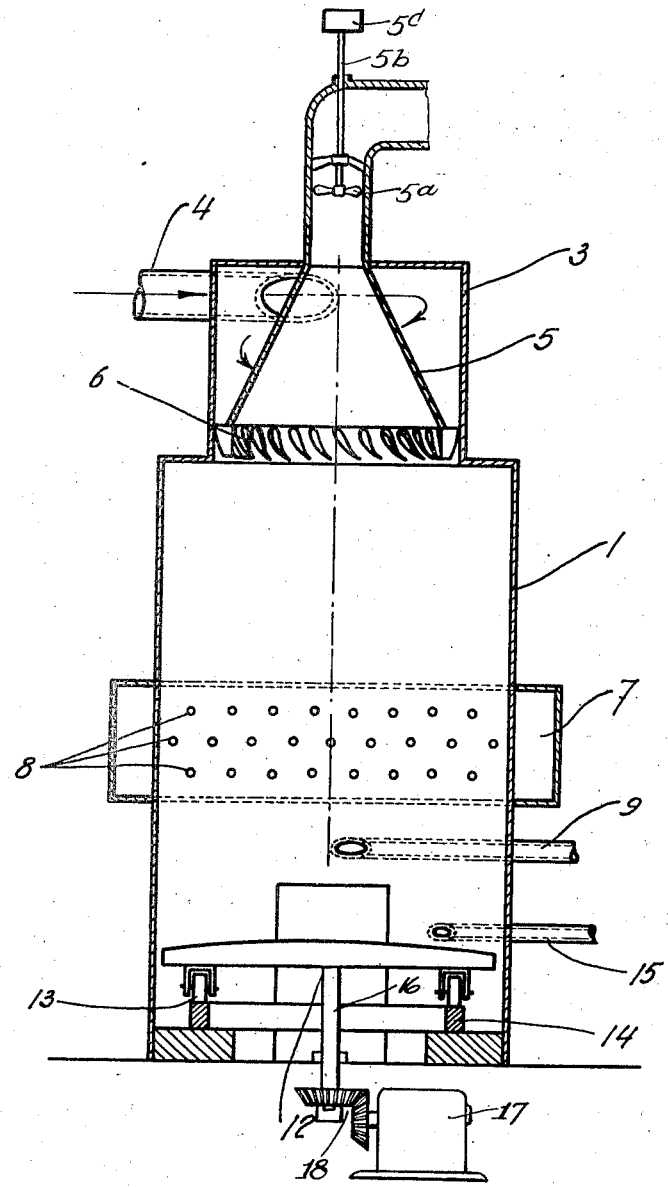

2,113,619

UNITED STATES PATENT OFFICE 2,113,619

FURNACE FOR THE AGGLOMERATION OF PULVERULENT MATERIALS

Eugène Camille Saint-Jacques, Paris, France

Application March 4, 1936, Serial No. 67,136
In France June 15, 1934

2 Claims. (Cl. 266—29)

Furnaces are already known for the fusion of materials such as ores, for example, in which these materials, previously comminuted are introduced tangentially with a gas supporting combustion or combustible gas which holds them in suspension so that they assume inside the cylindrical body of the furnace a turbulent movement.

During their turbulent descent, the materials to be treated may be subjected to the action of combustion air and/or flames which rise inside the body of the furnace under the effect of the internal depression created by a suction fan communicating with the top of the furnace.

The particles of molten materials fall into the bottom of the furnace where they are collected while the gases or vapours produced are exhausted by the fan.

Now it may be desired to transform materials, ores or others, into agglomerates, cement clinkers, etc.

In this case it is no longer the fusion of the materials which is sought, the particles of material should remain relatively solid, so as to be able to agglomerate together and to be collected in the form of agglomerates, or clinkers.

For this purpose according to the present invention there is arranged at the lower part of the body of the furnace then serving as a heater, a hearth fixed or rotating, combined with means for heating this hearth (burners or others). It is upon this hearth that there accumulate, while agglomerating, the particles of heated material (without being brought to the state of complete fusion) during their turbulent descent inside the heater.

The particles of materials entering the body of the furnace and descending there with turbulence are heated thus simply until they reach temperatures of above 1000° C. for example, but without entering entirely into fusion.

In the attached drawing, there has been shown by way of non-limiting example an embodiment of the subject of the invention, in section.

1 is the cylindrical body of the furnace which communicates at its upper part with a cylindrical extension 3 to which is connected tangentially a pipe 4 through which the gas holding in suspension the matter to be treated enters, the material being previously crushed sufficiently fine to offer a large surface to the grilling or calcining action which thus requires little heat.

In the interior of the cylindrical extension 3 is arranged an inverted cone-shaped funnel 5, the top of which communicates with a suction fan 5ª, supported and driven by shaft 5ᵇ which is rotated by a pulley 5ᶜ driven by a belt (not shown). The base of the funnel is connected to the wall of the cylindrical extension by the intermediary of blades 6, preferably inwardly curved, distributed uniformly over the whole of the circumference, and between which the material and the gases are caused to enter into the body 1.

The necessary combustion air is admitted under pressure into an annular chamber 7 from which it enters into the cylindrical body 1 by open apertures 8.

9 is a gas, heavy oil, pulverized fuel, or other burner, the flame of which enters tangentially into the cylindrical part 1 and rises during the operation of the apparatus under the effect of the internal depression created by the suction fan, so as to enter into contact with the gyratory current bringing down the materials to be treated.

The diameter of the extension 3 is substantially smaller than that of the body 1.

12 is a rotating hearth arranged at the inside of the body 1 provided with rollers 13 rolling on a circular track 14 and covered preferably with a refractory lining. 15 is a burner which serves for heating up the hearth 12.

The operation of the furnace is as follows:

The pulverulent material to be treated, in suspension in the gaseous fluid, and mixed if necessary with fluxes or other materials likewise in the pulverulent state, is tangentially introduced into the space between the cone 5 and the cylindrical extension 3 and takes up a spiral descending movement in this space. During this movement the material is distributed in a uniform manner around the cone 5 so that all the circumference of the cone is uniformly covered.

The speeding up of the mixture of gases and material takes place progressively by reason of the progressive throttling of the section of the space between the cone 5 and the envelope 3. The mixture assumes a greater and greater speed proportional to the extent of its spiral descent and when it arrives in the very narrow annular space occupied by the blades 6 it is automatically entrained and directed into the interior of the heater 1 through these blades which are preferably inwardly curved, so as to flatten the spirals followed by the mixture to be treated in its spiral descending movement through this heater; consequently the material to be treated follows in this latter a longer path and consequently remains there longer, which ensures a more intense heating of the particles of materials treated.

Entering into the body 1 (of larger diameter)

through the blades 6 the particles of the material to be treated continue their spiral descent with preferably flattened spirals, inside the heater. During this time the fan which communicates with the top of the cone 5 produces an exhaust currrent, up the axis of the circular path followed by the mixture of gas and material, of the combustion air under pressure entering into the body 1 of the furnace through the apertures 8.

Due to this combination of gyratory movement imparted to the mixture of gas and pulverulent materials with an ascending exhaust current, there is produced on the one hand a proper intermixing of the gases and the materials, and on the other hand slowing of the gravitational fall of these latter, in fact an effect of horizontal separation or classification of the materials which, while accentuating the dispersion of these latter in the midst of the gaseous current, facilitates their contact with the combustion gases.

Inside the heater 1, the current of gases holding in suspension the material to be treated, is ignited by any known means, for example with the aid of a burner 9. During their spiral gyration in the interior of the furnace, the particles of material have enough time to heat up to temperatures of above 1000° C. for example, and possibly to react; the gases produced being drawn out by the fan which communicates with the top of the cone 5.

Thus brought to elevated temperature in the heater 1, the particles of material fall upon the hearth 12 heated by the burner 15, and accumulate there forming agglomerates or clinkers.

What I claim is:

1. In a furnace of the class described, a cylindrical body, a circular extension therefor at the upper end of substantially smaller diameter than the said body, means for tangentially distributing into said extension the material to be heated in suspension in a fluid fuel, means in said extension for causing progressive increase of speed of the mixture of fuel and material, said means comprising a truncated cone axially disposed inside of said extension and of less diameter than the extension, the base of said cone being adjacent the junction of the extension and the cylindrical body, means adjacent said junction for directing the mixture of fuel and material downwardly and inwardly toward the axis of the cylindrical body, the open end of said cone having connected thereto suction-producing means, said suction means causing a current of air to move along the axis of the spiral path followed by the mixture of fuel and material in a direction opposite to the component of the spiral path along the axis, a rotatable hearth within the lower part of the cylindrical body, and means for heating said hearth.

2. In a furnace of the class described, a cylindrical body, a circular extension therefor at the upper end of substantially smaller diameter than the said body, means for tangentially distributing into said extension the material to be heated in suspension in a fluid fuel, means in said extension for causing progressive increase of speed of the mixture of fuel and material, said means comprising a truncated cone axially disposed inside of said extension and of less diameter than the extension, the base of said cone being adjacent the junction of the extension and the cylindrical body, blades between the base and the wall of the extension for directing the mixture of fuel and material downwardly and toward the axis of the cylindrical body in the same direction of rotation as that of the mixture, the open end of said cone having connected thereto suction-producing means, said suction means causing a current of air to move along the axis of the spiral path followed by the mixture of fuel and material in a direction opposite to the component of the spiral path along the axis, a rotatable hearth within the lower part of the cylindrical body, and means for heating said hearth.

EUGÈNE CAMILLE SAINT-JACQUES.